United States Patent
Sprague

(10) Patent No.: US 9,778,473 B1
(45) Date of Patent: Oct. 3, 2017

(54) DARK LINE COMPENSATION IN POLARIZED THREE-DIMENSIONAL VIEWING

(71) Applicant: Amazon Technologies, Inc., Reno, NV (US)

(72) Inventor: Robert Arthur Sprague, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/310,833

(22) Filed: Jun. 20, 2014

(51) Int. Cl.
G02B 27/26 (2006.01)
H04N 13/04 (2006.01)
G02B 27/28 (2006.01)
G02B 27/22 (2006.01)

(52) U.S. Cl.
CPC ......... *G02B 27/26* (2013.01); *H04N 13/0434* (2013.01); *G02B 27/2242* (2013.01); *G02B 27/28* (2013.01); *G02B 27/281* (2013.01); *G02B 27/283* (2013.01); *G02B 27/285* (2013.01); *G02B 27/286* (2013.01); *G02B 27/288* (2013.01)

(58) Field of Classification Search
CPC ................ G02B 27/26; G02B 27/2242; G02B 27/28–27/288; G02B 27/4216; H04N 13/0434
USPC ......................................... 359/465
See application file for complete search history.

(56) References Cited

U.S. PATENT DOCUMENTS

| 5,327,153 A * | 7/1994 | Biverot .............. H04N 13/0436 345/32 |
| 5,991,074 A | 11/1999 | Nose et al. |
| 6,731,434 B1 * | 5/2004 | Hua ..................... G02B 5/1814 359/619 |
| 8,587,736 B2 * | 11/2013 | Kang ................. G02B 27/2264 349/13 |
| 8,786,685 B1 | 7/2014 | Sethna et al. |
| 2002/0191073 A1 * | 12/2002 | Satoh ..................... G02B 27/26 348/51 |
| 2011/0221982 A1 | 9/2011 | Tanaka |
| 2011/0261451 A1 | 10/2011 | Kwrk |

(Continued)

FOREIGN PATENT DOCUMENTS

WO    WO2011078471 A2    6/2011

OTHER PUBLICATIONS

Office action for U.S. Appl. No. 14/310,828, dated Oct. 21, 2016, Sprague, "Dark Line Compensation in Polarized Three-Dimensional Viewing", 36 pages.

(Continued)

*Primary Examiner* — Jordan Schwartz
*Assistant Examiner* — George G King
(74) *Attorney, Agent, or Firm* — Lee & Hayes, PLLC

(57) ABSTRACT

Three-dimensional display systems may include polarized displays that polarize light emitted from a first set of areas of the display with a first polarization for a first eye of the viewer and that polarizes light emitted from a second set of areas of the display with a second polarization for a second eye of the viewer. This may result in dark areas being perceived by a viewer when viewed through polarized 3D glasses. Systems and technologies according to this disclosure may include 3D glasses that have a lenses configured to redirect a portion of incoming light in a first axis to at least partially illuminate the dark areas.

20 Claims, 14 Drawing Sheets

(56) References Cited

U.S. PATENT DOCUMENTS

| | | | |
|---|---|---|---|
| 2013/0329304 A1* | 12/2013 | Hua | G02B 13/22 |
| | | | 359/663 |
| 2014/0029096 A1* | 1/2014 | Kessler | G02B 27/26 |
| | | | 359/465 |
| 2015/0002940 A1* | 1/2015 | Nister | G02B 27/0172 |
| | | | 359/630 |
| 2015/0205131 A1* | 7/2015 | Border | G02B 27/0172 |
| | | | 359/630 |

OTHER PUBLICATIONS

Office action for U.S. Appl. No. 14/310,828, dated Apr. 13, 2016, Sprague, "Dark Line Compensation in Polarized Three-Dimensional Viewing", 33 pages.

Office action for U.S. Appl. No. 14/310,766, dated Jun. 5, 2017, Sprague, "Dark Line Compensation in Polarized Three-Dimensional Viewing", 13 pages.

Office Action for U.S. Appl. No. 14/310,828, dated Jul. 14, 2017, Sprague, "Dark Line Compensation in Polarized Three-Dimensional Viewing", 25 pages.

* cited by examiner

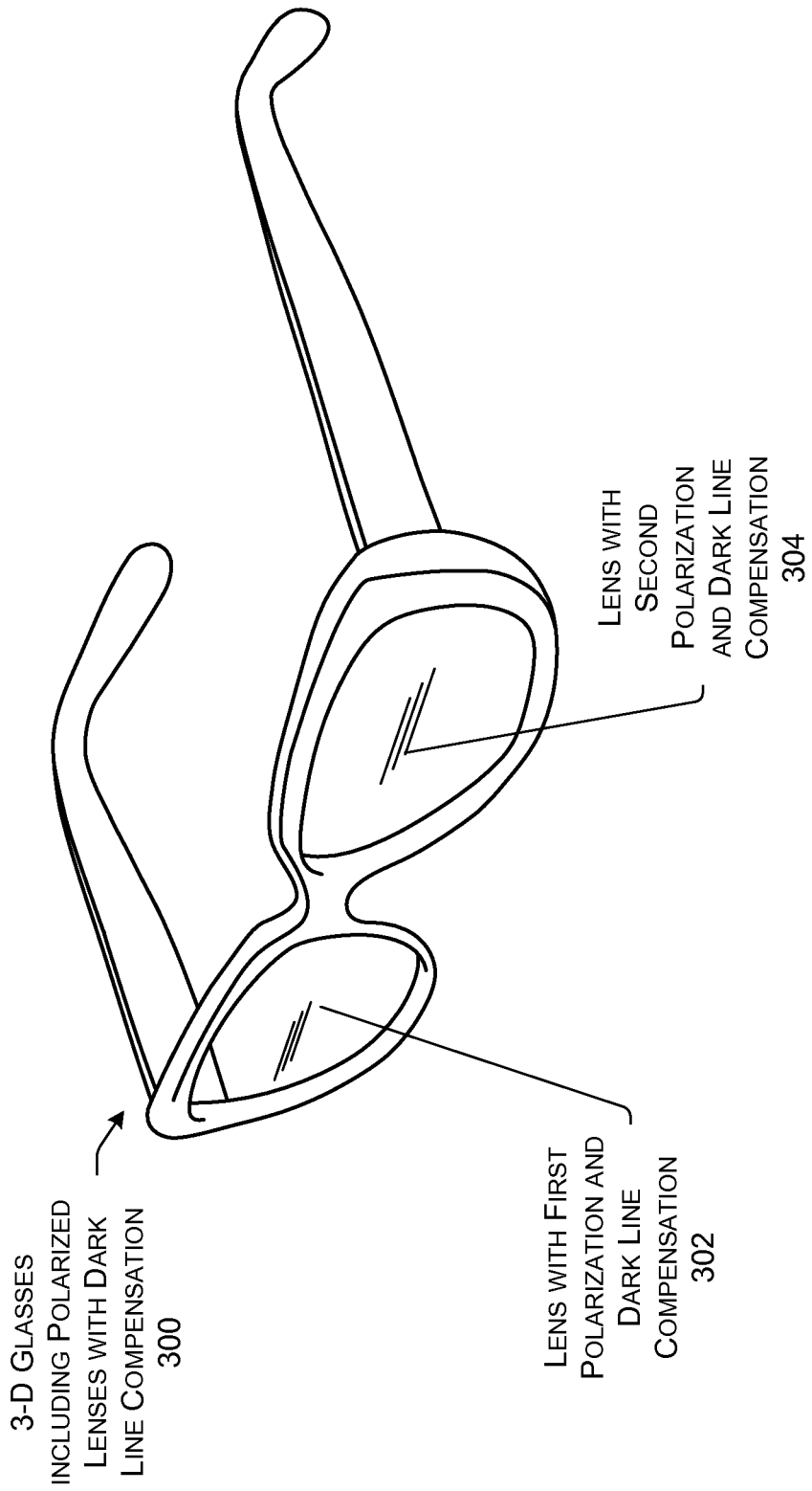

DARK LINE COMPENSATION IN POLARIZED THREE-DIMENSIONAL VIEWING

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example pair of 3D glasses that include polarized lenses with dark line compensation according to an embodiment of the present invention.

DETAILED DESCRIPTION

Figure 1:
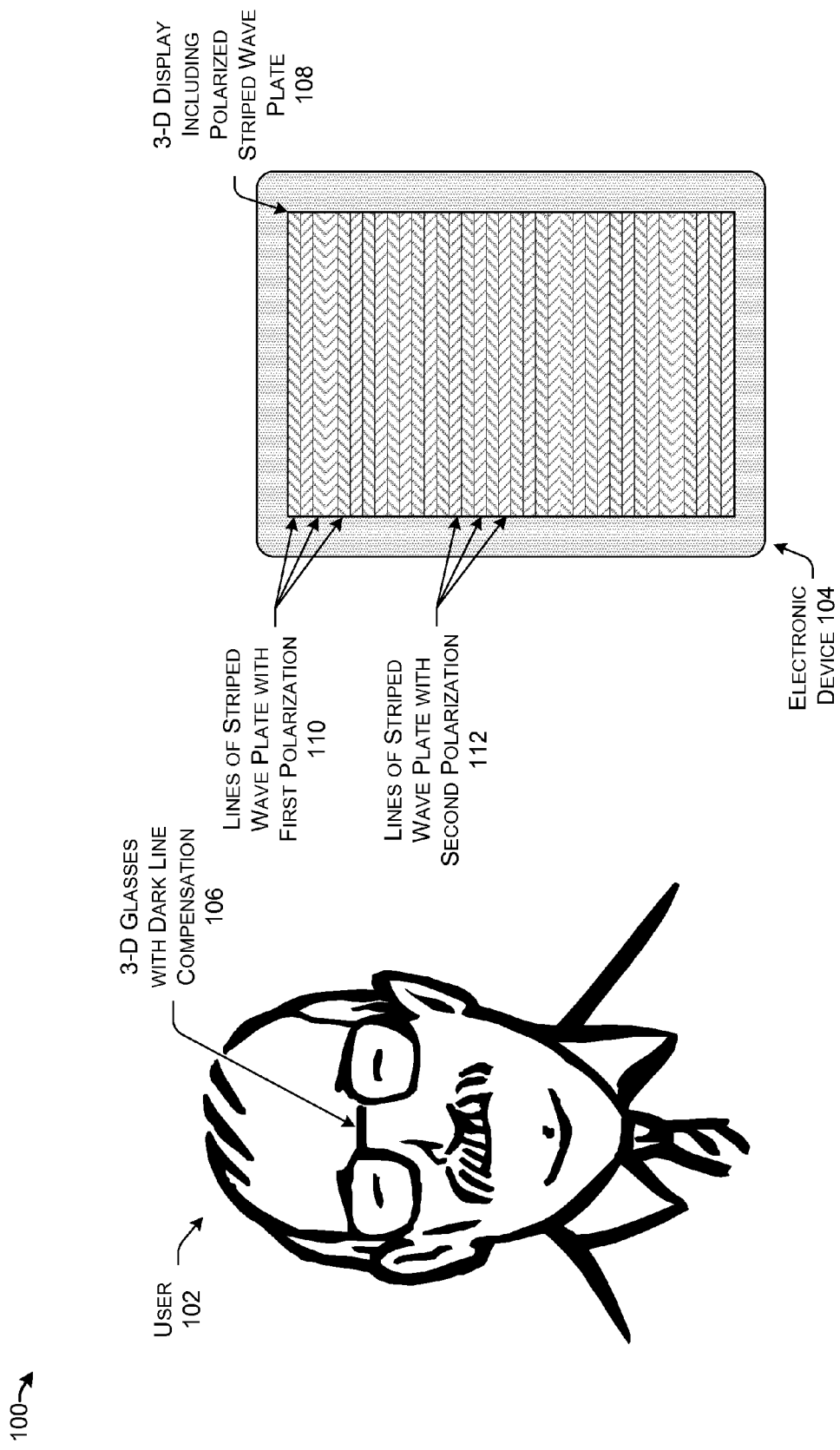
FIG. 1 illustrates an example 3D display system including dark line compensation according to an embodiment of the present invention.

This disclosure describes, in part, systems that provide dark line compensation or other artifact compensation in, for example, polarized three-dimensional (3D) displays and uses thereof. In some implementations, the disclosed system and techniques may also operate to allow improved picture quality in polarized 3D display systems. The terms "polarization," "polarized," and the like as used herein encompass any non-trivial indication of the direction or sense of oscillation of light; the indication may be precise or approximate, complete or incomplete.

To present stereoscopic images and films, two images are projected superimposed onto the same screen or display through different polarizing filters. In some example implementations, the displays of 3D systems include a striped wave plate or similar component that polarizes light emitted from different stripes (also referred to herein as lines) or other areas of the display with different and/or alternating polarizations, (e.g. two polarizations, one for the viewer's left eye and one for the viewer's right eye). The stripes of the striped wave plate may be rectangles with a long side the width or height of the display and a short side being, for example, on the order of one to four pixels in width. In some implementations, the number of pixels of the display in the direction of the short side of the stripes or areas is equal to or a multiple of the number of stripes. In other words, in some implementations including a 1920 by 1080 resolution display, the number of stripes may be 1080, 540, 270, etc. However, this is merely an example, and implementations are not limited to any particular configuration of striped wave plate.

In some implementation, the polarized 3D system may use passive 3D glasses to create the illusion of three-dimensional images by restricting the light that reaches each eye, an example of stereoscopy. In particular, the viewer wears eyeglasses which contain a pair of different polarizing filters. The lenses may filter out the polarized light of the set of areas (e.g. stripes) of the display corresponding to, or to be viewed by, the other eye of the viewer. The lenses pass or do not filter out at least the light from the set of areas of the display intended to be viewed by the eye of the viewer corresponding to the lens. As each filter passes only that light which is similarly polarized and blocks the light polarized in the opposite polarization, each eye sees a different image. This is used to produce a three-dimensional effect by projecting the same scene into both eyes, but depicted from slightly different perspectives.

As mentioned above, the polarization of the stripes may alternate between a polarization for a left lens of the 3D glasses and a polarization for the right lens of 3D glasses. As a result, if a user closely examines the display with one eye through a conventional polarized 3D glasses lens, the user may perceive dark lines corresponding to the stripes polarized for the other eye.

At most times, the viewer's brain and/or optical faculties compensate by fusing the different images presented to the viewer's eyes such that the viewer sees the 3D image without artifacts (i.e. without the dark lines). However, this is not always successful. In such cases, the viewer may perceive the dark lines or areas (hereinafter, dark lines) in the viewed image even with both eyes open. Some implementations according to this disclosure compensate for or alleviate the effects of the dark lines.

In particular, some implementations according to this disclosure include passive polarized 3D glasses that are configured to redirect or scatter light from the display such that light from unfiltered areas is seen in areas that otherwise would be dark. In other words, the lenses of the 3D glasses redirect the light such that the dark lines are filled with light from neighboring bright lines. In this way, the dark lines are brightened for each eye by being replaced with a light level which is a sum of the neighboring active (i.e., bright) lines.

There are numerous mechanisms that may be added to the passive 3D glasses to redirect the light from unfiltered areas into filtered areas. Some examples include the inclusion of one or more of the following in the glasses: phase grating structures with a controlled diffraction profile; uniaxial directional scatter plates; low-power cylindrical lens(es); microstructures of tiled prisms or slabs; or a vibrating wave plate or glass in the lens. Further discussion of these mechanisms is provided below in the discussion of the FIGS. 1-9.

Other implementations may include 3D glasses that are active polarization glasses. In such implementations, the lenses of the glasses may be alternated from one polarization state to the other. For example, the left side lens may be polarized to a first polarization state for a first frame, then switched to a second polarization state for a second frame and then switched back to the first polarization state for a third frame, and so on.

Synchronized with the switching of the polarization state of the glasses, the display may alternate between display states. For example, the alternating of display states may include alternating areas of the display (e.g. defined by the stripes of a striped wave plate device) from showing content intended for the left eye to content intended for the right eye. The details of the content presentation may vary from implementation to implementation. For example, in some implementations, the content displayed in a first area and an adjacent second area may be swapped between pairs of consecutive frames without changing the content. In other words, the same content may be displayed but shifted between the adjacent areas or stripes in a first frame (i.e. a first display state) and a second frame (i.e. a second display state) of a pair of consecutive frames. Alternatively, the content may be different but the position shift between the stripes may not be reflected. In other implementations, the content between the adjacent areas or stripes may be different such that, every two frames combine to provide a full resolution image for each eye. Further, display states are not limited to alternating frames. Rather, any combination of frame or content changes or other measure may be used for determining the display states. Additional details of such implementations will be discussed with regard to FIGS. 10-13.

FIG. 1 illustrates an example system 100 that includes the passive dark line compensation introduced above. As illustrated, a user 102 is using an electronic device 104. In particular, the user 102 is utilizing 3D glasses with dark line compensation 106 to view the 3D display 108 of the electronic device 104. The electronic device 104 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). The 3D display 108 of the electronic device 104 includes a polarized striped wave plate that divides the display area of the 3D display 108 into a plurality of horizontal lines (shown as rows) of alternating polarization. In particular, the striped wave plate includes lines with a first polarization 110 and lines with a second polarization 112 (illustrated with different cross-hatching for ease of understanding). The 3D glasses 106 provide compensation for the dark line artifacts that result from the polarization of the alternating lines 110 and 112. For example, the lenses of the 3D glasses 106 may redirect a portion of incoming light in a vertical direction (i.e., up and down) such that a portion of the unfiltered light is perceived in the areas made dark by the polarization filtering. More details of the system 100 are discussed with regard to FIGS. 2A-9 below.

Figure 2A:
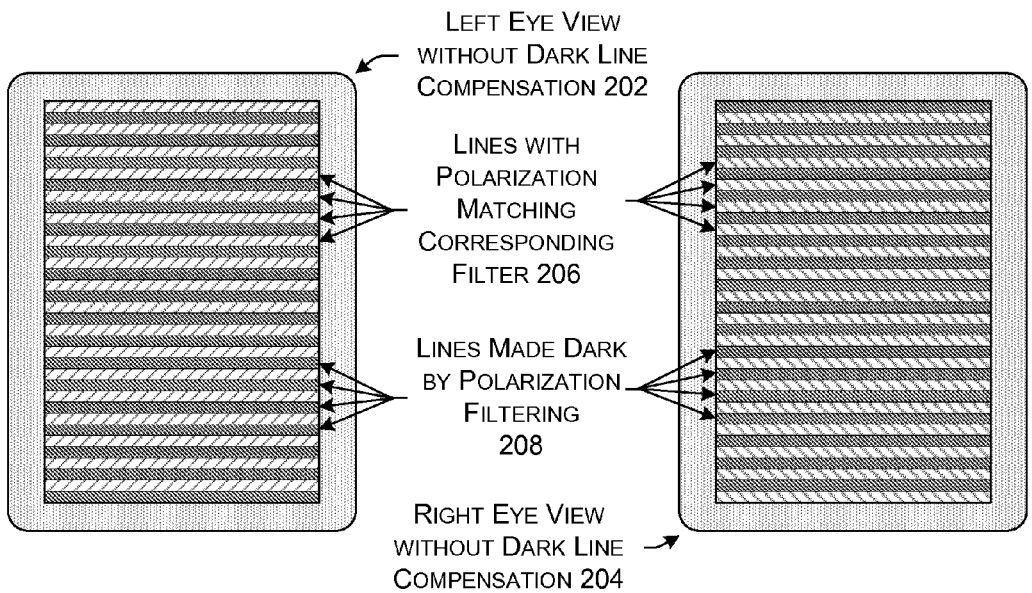
FIG. 2A illustrates an example diagram of the left and right views of a display using a striped wave plate device through 3D glasses without dark line compensation according to an embodiment of the present invention.

FIG. 2A illustrates an example diagram 200 of the left and right views of a display using a striped wave plate through 3D glasses without dark line compensation. In particular, FIG. 2A includes a left eye view without dark line compensation 202 and a right eye view without dark line compensation 204. As can be seen, each of the views 202 and 204 include both lines 206 that match the corresponding polarization filter of the left or right lenses of the glasses (i.e. lines that emit light that the lens does not filter out) and lines 208 that are made dark by the polarization filtering of the lenses of the 3D glasses.

Figure 2B:
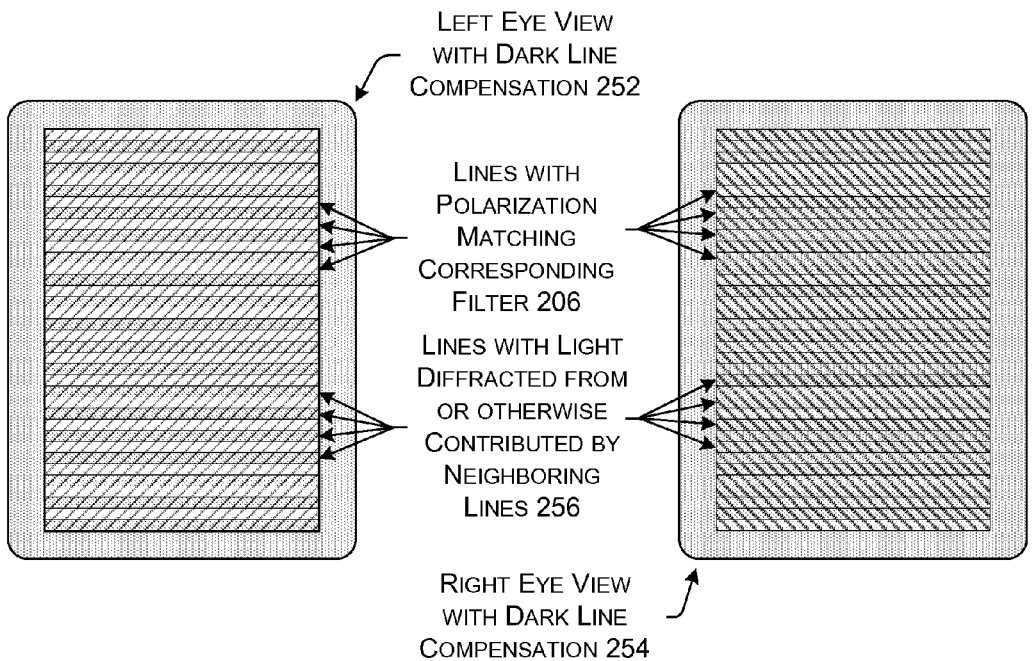
FIG. 2B illustrates an example diagram of the left and right views of a display using a striped wave plate device through 3D glasses with dark line compensation according to an embodiment of the present invention.

FIG. 2B illustrates an example diagram 250 of the left and right views of a display using a striped wave plate through 3D glasses with dark line compensation. In particular, FIG. 2B includes a left eye view with dark line compensation 252 and a right eye view with dark line compensation 254. As can be seen, each of the views 202 and 204 include both lines 206 that match the corresponding polarization filter of the left or right lenses of the glasses and lines 256 that are darkened by the polarization filtering but also brightened by light redirected by the lenses of the 3D glasses from neighboring striped lines.

FIG. 3 illustrates an example pair of 3D glasses 300 that include polarized lenses with dark line compensation. In particular, the glasses 300 in include a right lens 302 with a first polarization and a left lens 304 with a second polarization and which are configured to provide dark line compensation.

Depending on the particular implementation, various types of polarization may be used. Two example polarizations are linear polarization and circular polarization.

In linear polarization systems, to present a stereoscopic image, two images may be emitted from the same screen through orthogonal polarizing filters (e.g. at 45 and 135 degrees). A linear polarizer may convert unpolarized light into light of a single linear polarization. For example, where a linear polarizer is to polarize light into a "vertical" polarization, the linear polarizer may operate such that the vertical components of light waves are transmitted, while the horizontal components of the light waves are absorbed and/or reflected.

The viewer may wear linearly polarized eyeglasses which also contain a pair of orthogonal polarizing filters oriented the same as the polarizations of the striped wave plate or similar component of the display. As each filter only passes light which is similarly polarized and blocks the orthogonally polarized light, each eye only sees one of the images, and the 3D effect may be achieved.

In circular polarization systems, to present a stereoscopic image, two images may be emitted from the same screen through circular polarizing filters of opposite handedness. The viewer may wear eyeglasses which contain a pair of analyzing filters (i.e. circular polarizers mounted in reverse) of opposite handedness. Light that is left-circularly polarized is blocked by the right-handed analyzer, while right-circularly polarized light is extinguished by the left-handed analyzer. The result is similar to that of stereoscopic viewing using linearly polarized glasses. The analyzing filters may be constructed of a quarter-wave plate (QWP) and a linearly polarized filter (LPF). The QWP transforms circularly polarized light into linearly polarized light. However, the angle of polarization of the linearly polarized light produced by a QWP depends on the handedness of the circularly polarized light entering the QWP.

More detail on the lenses of the glasses 300 is shown and described with respect FIGS. 4-9.

Figure 4:
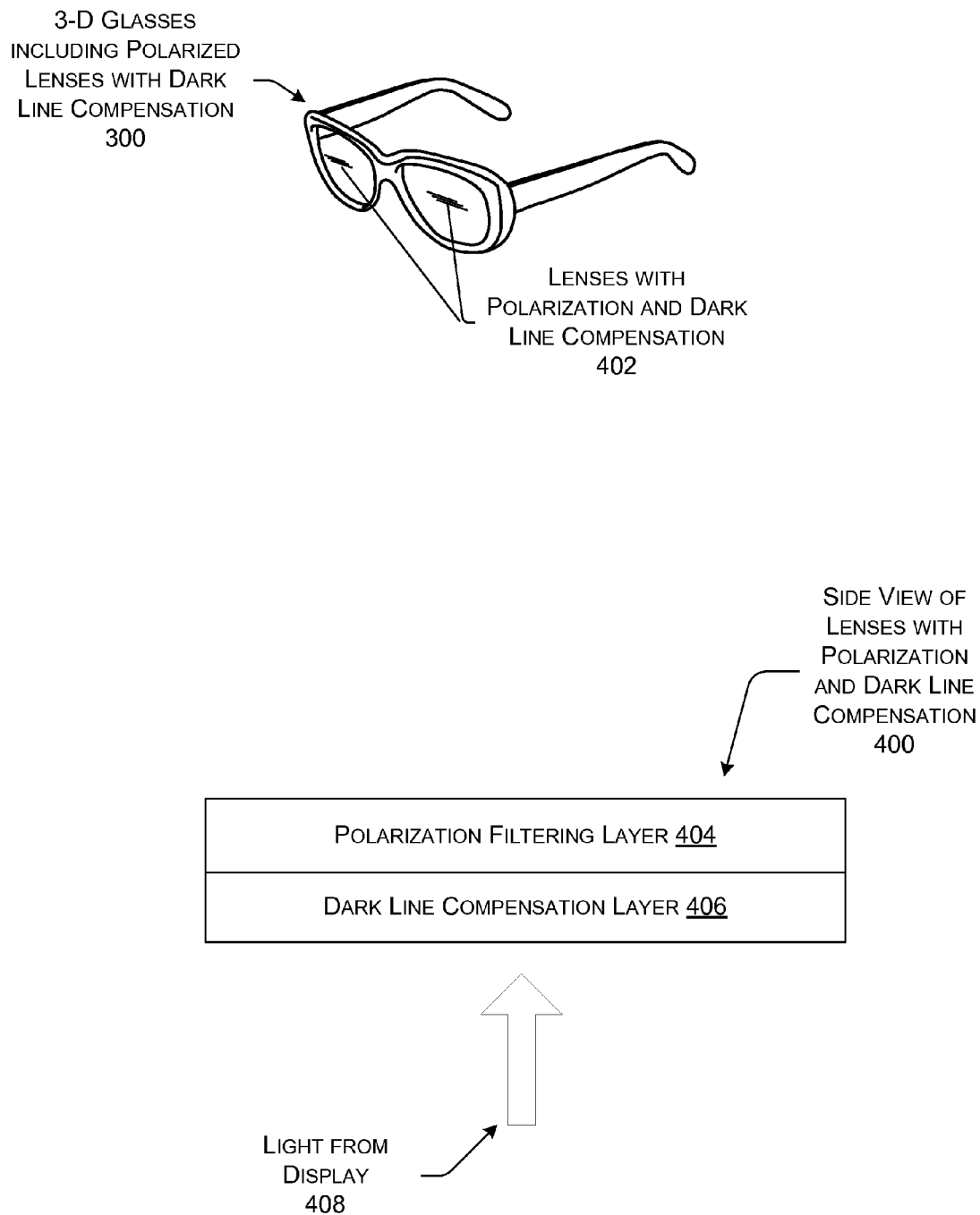
FIG. 4 illustrates a conceptual side view of a portion of a lens of 3D glasses with dark line compensation according to an embodiment of the present invention.

FIG. 4 illustrates a conceptual side view 400 of lenses 402 with polarization filtering and dark line compensation along the viewing axis. The lenses 402 may be the lenses of the 3D glasses 300 of FIG. 3.

The illustrated example side view of the lenses 402 includes two layers: a polarization filtering layer 404 and a dark line compensation layer 406. In the illustrated example, light 408 from a display enters the dark line compensation layer 406 which redirects a portion of the light 408 as the light continues into the polarization filtering layer 404. In some implementations, the dark line compensation layer 406 may be configured to redirect the portion of the light 408 in a direction perpendicular to the long sides of the stripes of the striped wave plate when a viewer is viewing the display (i.e. into adjacent stripes). However, in other implementations, the redirection of the light may be in other and/or additional directions. For the purposes of this application, discussion of the relative direction(s) the light is redirected and/or that involves the glasses and the display assumes the glasses are in a proper viewing orientation relative to the display.

As mentioned above, after passing though the dark line compensation layer 406, the light enters the polarization layer 404 of the lens which is configured to filter out light intended for the other eye of the viewer (e.g. user 102). It should be noted that while light enters the dark line compensation layer 406 before passing into the polarization layer 404, this is not a requirement and the dark line compensation layer 406 may instead be formed on the backside of the lens or otherwise on the viewer side of the polarization layer 404 from the display.

Further, while the example shown herein includes separate layers for the dark line compensation and the polarization filtering, this is not intended as a limitation. For example, some implementations, such as implementations utilizing a low power cylindrical lens to redirect light, may use a single lens layer.

Figure 5A:
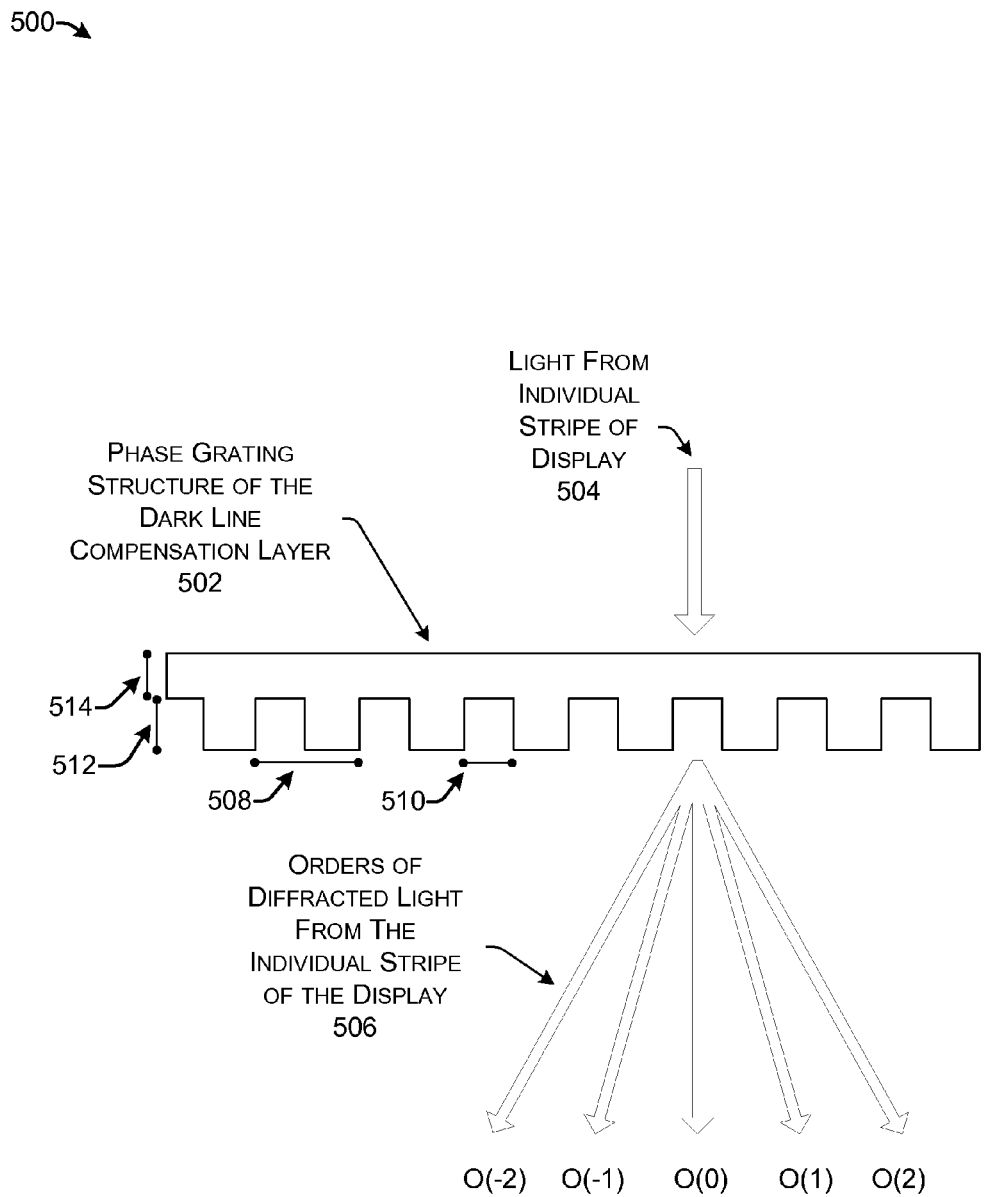
FIG. 5A illustrates an example diagram of a dark line compensation layer according to an embodiment of the present invention that includes a phase grating structure.

FIG. 5 illustrates an example diagram 500 of a dark line compensation layer including a phase grating structure 502.

In particular, the layer may include a repetitive linear phase structure called a phase grating that may be inserted in front of the lens. In some implementations, the shape of the phase grating may be controlled to enable the intensity of each of one or more diffraction orders to be controlled.

In general, in FIG. 5, light 504 from an individual stripe of the display is shown intersecting the phase grating structure 502. The light is diffracted into a diffraction pattern that may include one or more orders of diffracted light 506 from the individual stripe of the display, O(−2), O(−1), O(0), O(1) and O(2).

As shown, the phase grating structure is a repetitive linear phase structure. By controlling the shape and height of the phase grating, the intensity in each of its diffraction orders may be controlled. For example, the control of the number of diffraction orders and the spacing and intensity thereof may be accomplished by controlling the grating period 508, the etching width 510, etching depth 512, and index of the substrate 514 according to known techniques.

As mentioned previously, the phase grating structure 502 may be configured to control the diffraction of the light into diffraction orders in a direction perpendicular to the stripes of the striped wave plate (e.g. the striped wave plate of the display 108). For example, by setting the spacing, depth and other parameters of the etchings in the phase grating structure appropriately, the diffraction orders may be controlled such that the first order (O(1), O(−1)) causes a displaced image of the striped pattern to appear at one pixel spacing away from the original location, the displaced image of the second order appears two pixels away, and so forth. These displaced images may fill the dark lines with light from the neighboring illuminated lines with the ratio of the intensity being contributed by each of the neighboring lines depending on the relative intensity of each diffraction order.

Figure 5B:
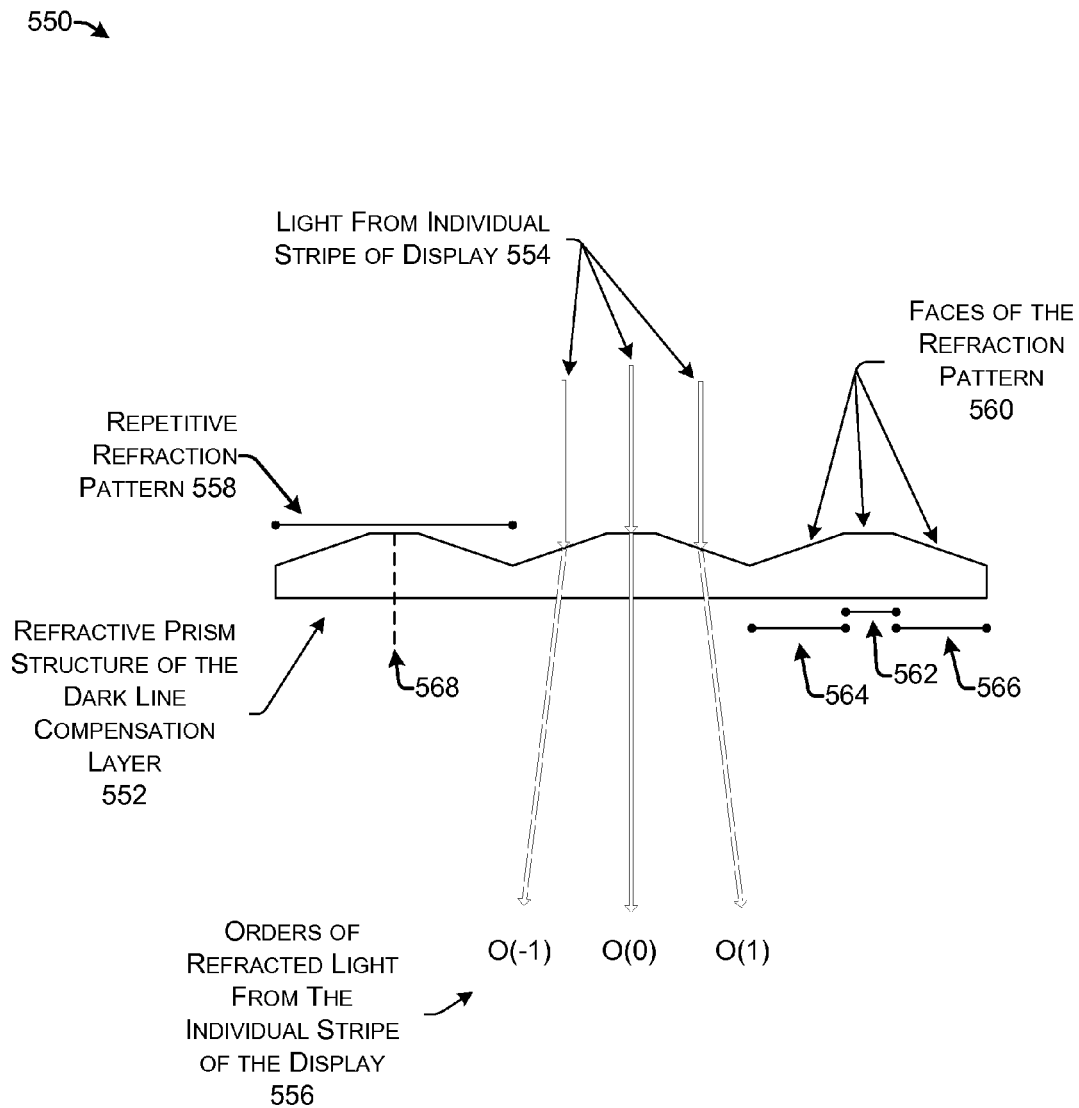
FIG. 5B illustrates an example diagram of a dark line compensation layer according to an embodiment of the present invention that includes a refractive prism structure.

FIG. 5B illustrates an example diagram 550 of another dark line compensation layer including a refractive prism structure 552. In particular, the layer may include a repetitive refraction pattern that may be etched or inserted in front of or behind the lens. In some implementations, the shape of the refraction pattern may be controlled to enable the intensity of each of one or more refraction orders to be controlled.

In general, in FIG. 5, light 554 from an individual stripe of the display is shown intersecting the refractive prism structure 552. The light is refracted into a refraction pattern that may include one or more orders of refracted light 556 from the individual stripe of the display, O(−1), O(0) and O(1).

As shown, the refractive prism structure 552 includes a repetitive refraction pattern 558. By controlling the number of, angle of and width of the faces of the refraction pattern 560, the number of, intensity of and refraction angle of each of its refraction orders may be controlled. More particularly, control of the number of refraction orders may be accomplished by choosing the number of faces of the refraction pattern 558. The intensity and spacing thereof may be accomplished by controlling the widths and angle of each face 562-566 respectively according to known techniques.

Each repetition of the refraction pattern 558 may be sized to limit the user's perception of the patterns. For example, the center to center 568 distance between refraction patterns may, in some implementations, fall into the range from a maximum distance less than of a minimum pupil diameter of the human eye (3 mm.) and a minimum distance of greater than:

$$(\text{wavelength of light}) * \frac{\text{line spacing}}{\text{viewing distance}}$$

For example, the minimum center to center distance may be ((0.0005 mm)/(0.075 mm/300 mm))=2 mm. This example is representative of a wavelength of light of 0.5 microns, a viewing distance of 30 cm, and a display resolution of 300 pixels per inch (ppi).

As mentioned previously, the refractive prism structure 552 may be configured to control the refraction of the light into refraction orders in a direction perpendicular to the stripes of the striped wave plate (e.g. the striped wave plate of the display 108). The displaced images may fill the dark lines with light from the neighboring illuminated lines with the ratio of the intensity being contributed by each of the neighboring lines depending on the relative intensity of each refraction order.

In another example implementation in which each striped wave plate line is two pixels wide, either the phase grating structure 502 or the refractive prism structure 552 may redirect light into orders with the relative intensities that may be set to approximately one (1) for the zeroth order (O(0)), 0.75 for the first order (O(−1) and O(1)), 0.625 for the second order (O(−2) and O(2)), with all other orders zero. In another such example, the relative intensities that may be set to approximately one-half (0.5) for the zeroth order (O(0)), one (1.0) for the first order (O(−1) and O(1)), with all other orders zero. Moreover, in some implementations, the redirecting of light (e.g. by diffraction or refraction) may not be symmetric. For example, in some implementations, the O(−1) order may be 0.75 and the O(1) order may be 0.5 or zero (0). In some implementations, such redirecting of light may provide reasonably uniform filling of the dark lines. More detail of the distribution of light by diffraction or refraction is shown and described below with regard to FIGS. 6-8 below.

Figure 6:
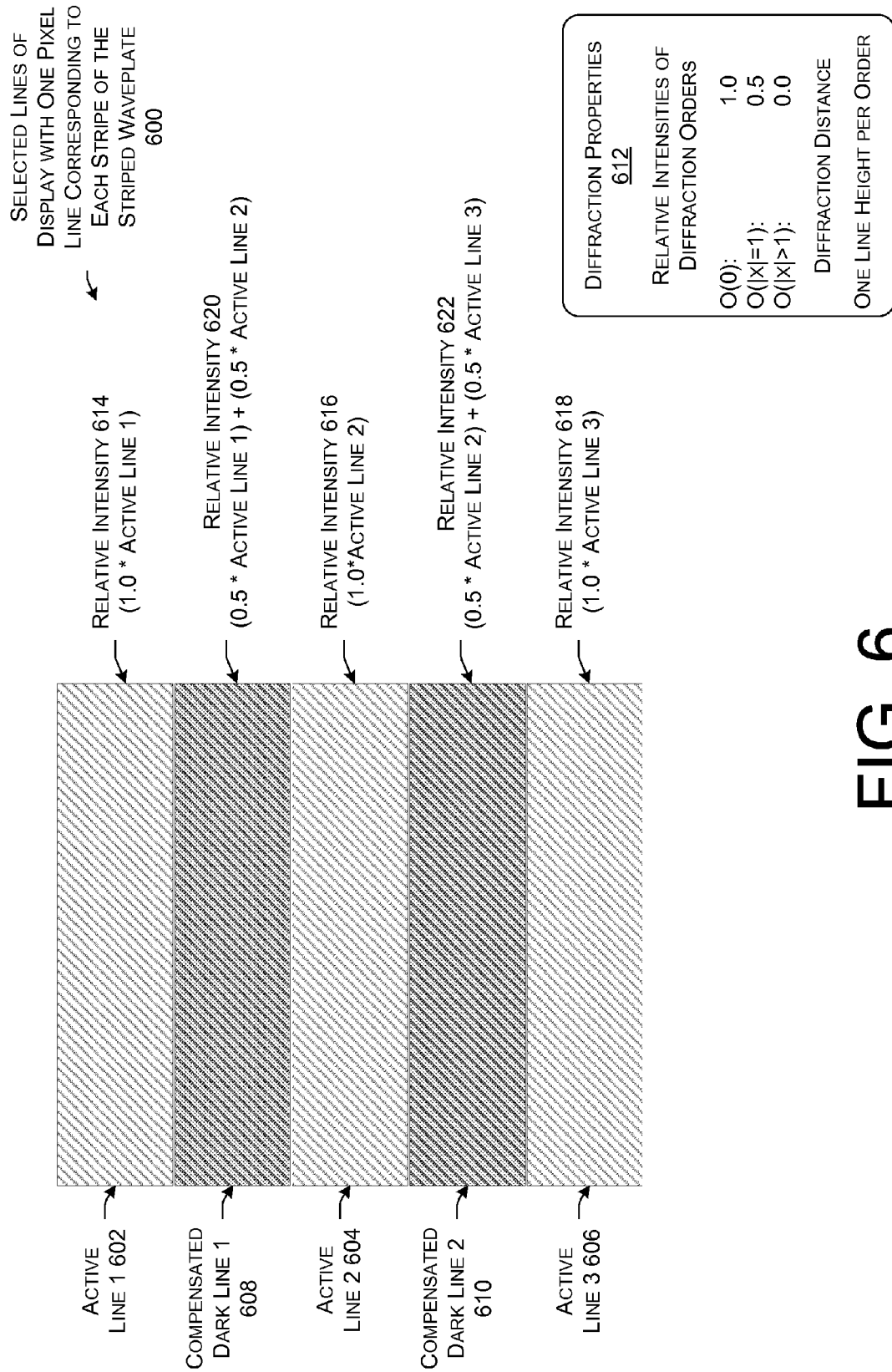
FIG. 6 illustrates an example area of an image including selected lines perceived by a viewer in an implementation in which the striped wave plate lines are one pixel in width according to an embodiment of the present invention.

FIG. 6 illustrates an example area of an image including selected lines 600 perceived by a viewer in an implementation in which the striped wave plate lines are one pixel in height. In particular, the selected lines include an active line 1 602, an active line 2 604, an active line 3 606, a compensated dark line 1 608 and a compensated dark line 2 610. The diffraction properties 612 of the phase grating are configured such that the relative intensities are one (1) for the zeroth order (O(0)), 0.5 for the first order (O(−1) and O(1)), and zero (0) for all greater orders. The diffraction distance being one stripe line or pixel height per order. In other words, the orders are separated by pixel height distances and are diffracted by a multiple of the pixel height of the display.

FIG. 6 further includes an indication of the relative intensities 614-622 of the lines 602-610, respectively. In the formulas, the label "Active Line X" represents the relative intensity of the zeroth order of the active line in question. Thus, as the relative intensities of the diffraction pattern is 1.0 for the zeroth order (O(0)), 0.75 for the first order (O(|x|)=1) and zero (0) for the second and greater orders, the relative intensities of the active lines 1-3 602-606 are all the relative intensity of the line's respective zeroth order, specifically, (1.0*active line X). At the same time, the relative intensities of the compensated dark line 1 610 and the compensated dark line 2 612 are the sum of 0.5 of the relative intensity of the zeroth order of the neighboring active lines. More particularly, the relative intensity 620 of line 608 is (0.5*active line 1)+(0.5*active line 2) and the relative intensity 622 of line 610 is (0.5*active line 2)+(0.5*active line 3).

Figure 7:
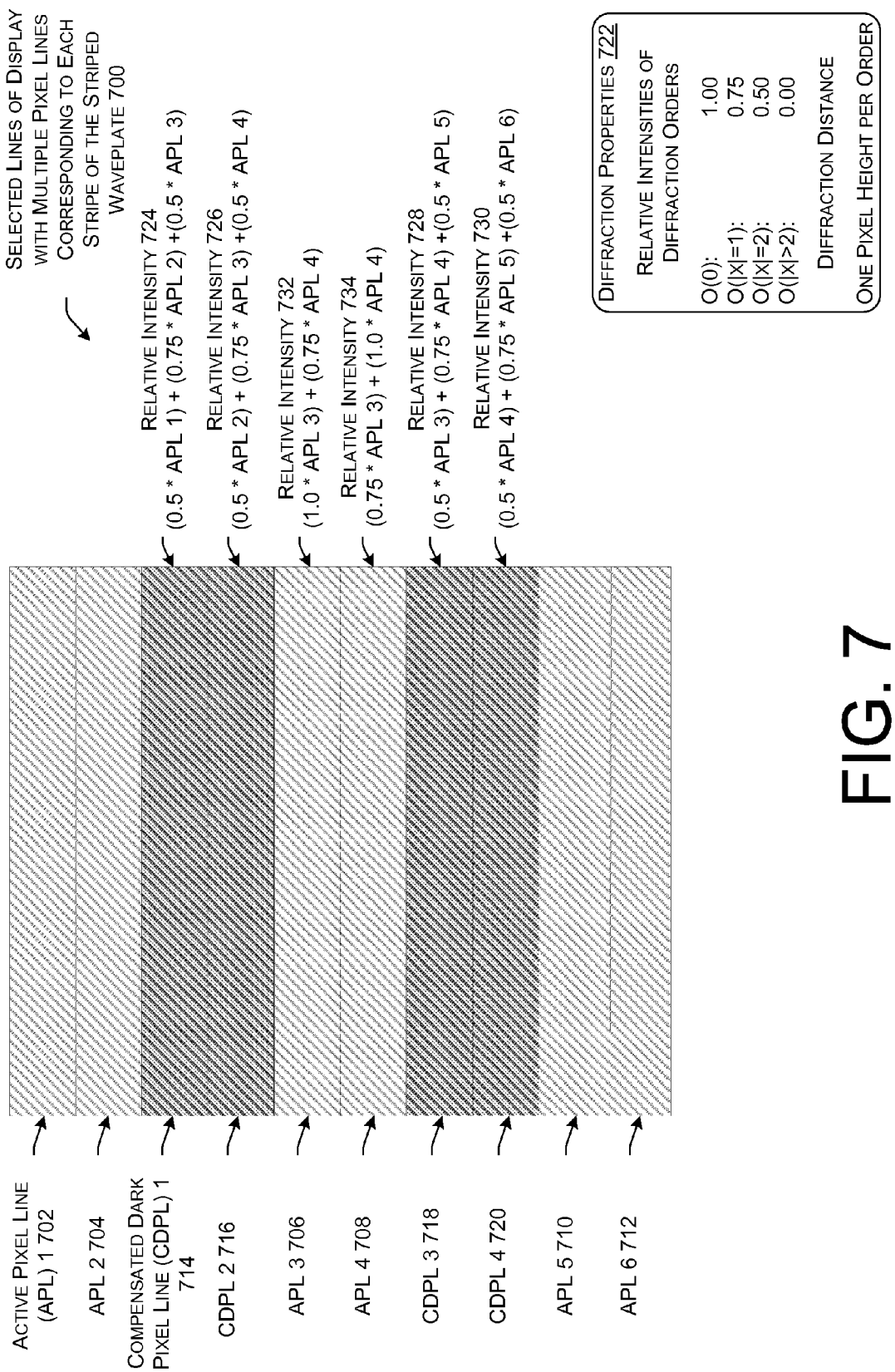
FIG. 7 illustrates an example area of an image including selected lines perceived by a viewer in an implementation in which the striped wave plate lines are two pixel heights in width according to an embodiment of the present invention.

FIG. 7 illustrates an example area of an image including selected lines 700 perceived by a viewer in an implementation in which the striped wave plate lines are two pixel heights in width. In particular, the selected lines include an active pixel line 1 702, an active pixel line 2 704, an active pixel line 3 706, an active pixel line 4 708, an active pixel line 5 710, an active pixel line 6 712, a compensated dark pixel line 1 714, a compensated dark pixel line 2 716, a compensated dark pixel line 3 718 and a compensated dark pixel line 4 720. For the discussion of FIGS. 7 and 8, the acronyms APL and CDPL are used in place of active pixel line and compensated dark pixel line. The diffraction properties 722 of the phase grating of FIG. 7 are configured such that the relative intensities are one (1) for the zeroth order (O(0)), 0.75 for the first order (O(|x|)=1), 0.5 for the second order (O(|x|=2)) and zero (0) for all greater orders. The diffraction distance is one pixel height per order. In other words, the orders are separated by pixel height distances and are diffracted by a multiple of the pixel height of the display.

FIG. 7 further includes an indication of the relative intensities 724-730 of the lines 706-708, 714-716 and 718-720, respectively. As with FIG. 6, in the formulas, the label "APL X" represents the relative intensity of the zeroth order of the active pixel line in question. Thus, the relative intensities of each particular APL 732-734 is the relative intensity of the zeroth order of the particular APL and 0.75 of the relative intensity of the APL adjacent the particular APL, specifically, (1.0*Particular APL+0.75*Adjacent APL). At the same time, the relative intensity of each Compensated Dark Pixel Line 724-730 is a weighted sum of the three nearest APL. More particularly, the relative intensity 724 of CDPL 1 714 is (0.5*APL 1)+(0.75*APL 2)+(0.5*APL 3), the relative intensity 726 of CDPL 2 716 is (0.5*APL 2)+(0.75*APL 3)+(0.5*APL 4), the relative intensity 728 of CDPL 3 718 is (0.5*APL 3)+(0.75*APL 4)+(0.5*APL 5) and the relative intensity 730 of CDPL 4 720 is (0.5*APL 4)+(0.75*APL 5)+(0.5*APL 6).

Figure 8:
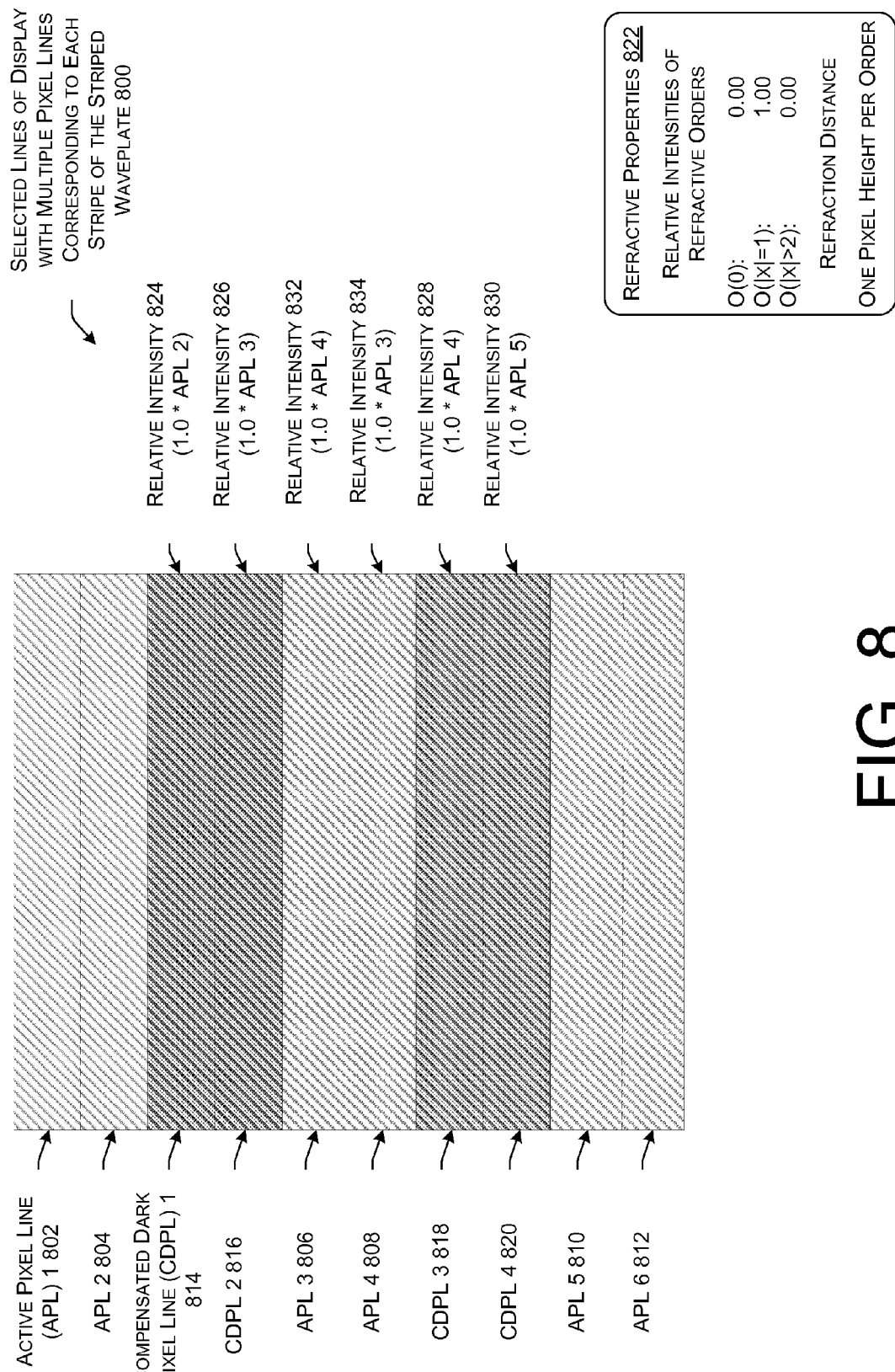
FIG. 8 illustrates another example area of an image including selected lines perceived by a viewer in an implementation in which the striped wave plate lines are two pixel heights in width according to an embodiment of the present invention.

FIG. 8 illustrates an example area of an image including selected lines 800 perceived by a viewer in another implementation in which the striped wave plate lines are two pixel heights in width. In particular, the selected lines include an active pixel line 1 802, an active pixel line 2 804, an active pixel line 3 806, an active pixel line 4 808, an active pixel line 5 810, an active pixel line 6 812, a compensated dark pixel line 1 814, a compensated dark pixel line 2 816, a compensated dark pixel line 3 818 and a compensated dark pixel line 4 820. FIG. 8 illustrates an example implementation in which light from the display is refracted into by a refractive prism structure in which each refraction pattern has no central flat face and one angled face on each side of the center of the refraction pattern. The refraction properties 822 of the refractive prism structure of FIG. 8 are configured such that the relative intensities are zero (0) for the zeroth order (O(0)), 1.0 for the first order (O(|x|)=1) and zero (0) for all greater orders. The refraction distance is one pixel height per order. In other words, the orders are separated by pixel height distances and are refracted by a multiple of the pixel height of the display.

FIG. 8 further includes an indication of the relative intensities 824-830 of the lines 806-808, 814-816 and 818-820, respectively. As with FIGS. 6 and 7, in the formulas, the label "APL X" represents the relative intensity of the zeroth order of the active pixel line in question. However, because the relative intensity of the zeroth order caused by the refraction pattern in question is zero (0), the relative intensity of each particular APL 832-834 is the relative intensity of the first order of the APL adjacent the particular APL, specifically, (1.0*Adjacent APL). Similarly, the relative intensity of each Compensated Dark Pixel Line 824-830 is the relative intensity of the first order of the APL adjacent the particular CDPL. More particularly, the relative intensity 824 of CDPL 1 814 is (1.0*APL 2), the relative intensity 826 of CDPL 2 816 is (1.0*APL 3), the relative intensity 828 of CDPL 3 818 is (1.0*APL 4) and the relative intensity 830 of CDPL 4 820 is (1.0*APL 5).

Because the redirected light illuminates the dark lines, the visibility of the dark lines is reduced or eliminated. As such, the viewer's viewing experience may be improved.

As would be understood by one of ordinary skill in the art, the particular details shown in FIGS. 2-8 are not intended to be limiting on the disclosed techniques and systems. For example, as mentioned above, implementations are not limited to the use of phase grating structures to redirect light to dark lines. Below, a discussion of example alternatives to phase grating structures and refractive prism structures is provided.

In some implementations, a uniaxial directional scatter plate may be used to redirect light to dark lines. In some implementations, the uniaxial directional scatter plate may be a one dimensional scatter plate of random configuration that causes light to be scattered in a small angle in the direction orthogonal to the wave plate stripe lines. This may achieve a similar result to phase grating structure described above with some intensity control.

In some implementations, a low power cylindrical lens may be used to redirect light to dark lines. In some implementations, a very low power cylindrical lens (e.g. 0.2 diopters) may be placed in front of the eyeglasses to defocus the image in one axis enough that the dark lines are blurred out.

In some implementations, microstructures of tiled prisms or slabs may be used to redirect light to dark lines. For example, images may be displaced laterally by being transmitted through a tilted slab of transparent material or through a wedged piece of transparent material. In some such implementations, a microstructure layer is formed on the lens of the glasses. The microstructure may have a structure too small to be seen by the unaided eye, which has mixtures of tiled plate pieces or optical wedges to direct light just off axis to the striped wave plate to achieve a result similar to that described above.

In still other implementations, vibration of an optical element in the glasses or the display may be used to redirect light to dark lines. In particular, illuminating the dark lines with light may be achieved by moving an optical element in the system in the direction perpendicular to the stripe lines at rate too high for the eye to detect (e.g. 60 Hz). Such movement may be on the order of 1-2 lines of pixels, or roughly 1-200 microns and may be achieved with a piezoelectric vibrator. Various elements could be vibrated to achieve the effect, such as the striped wave plate, an optical displacement element, a mirror, or another element.

Figure 9:
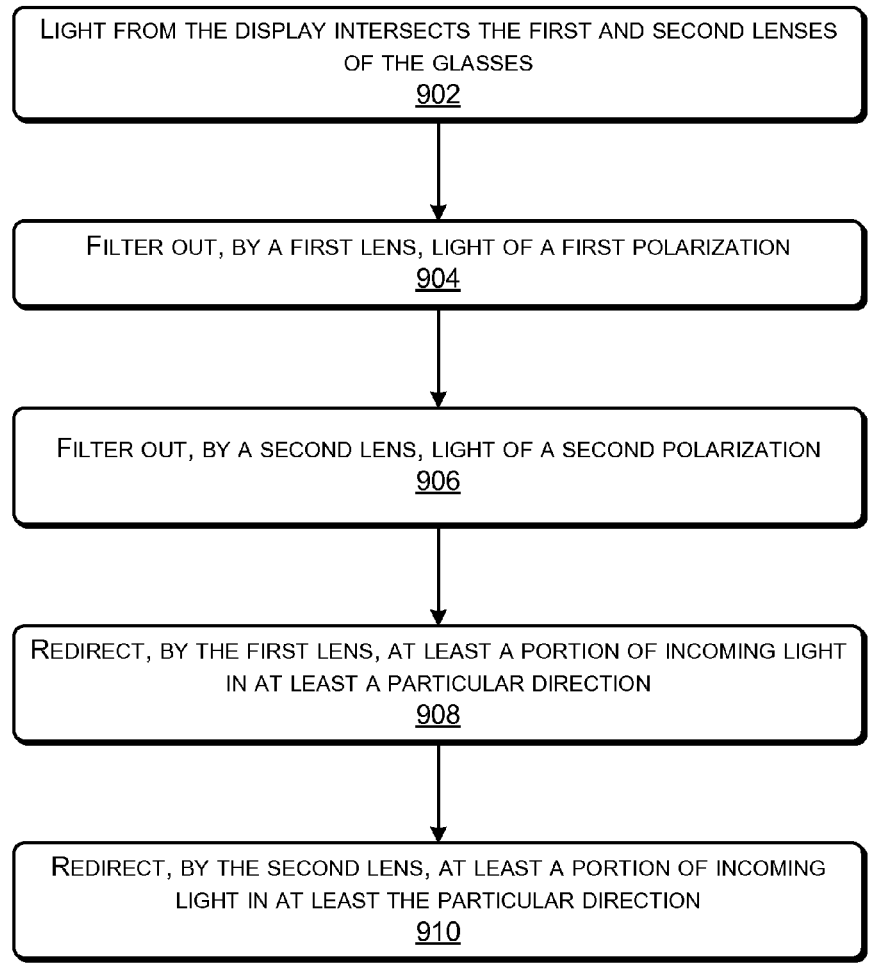
FIG. 9 illustrates an example flow diagram for the operations of the 3D glasses with dark line compensation according to an embodiment of the present invention.

FIG. 9 illustrates an example flow diagram 900 for the operations of the 3-D glasses including polarized lenses with dark line compensation 300 to provide 3D images in a polarized 3D system using the techniques described herein. The order in which the operations are described is not intended to be construed as a limitation, and any number of the described operations can be combined in any order and/or in parallel to implement the process.

At 902, light from a display intersects the first and second polarized lenses with dark line compensation of the polarized 3-D glasses. At 904, the first lens filters out light of a first polarization (e.g. left or right circular polarization) and passes at least light of a second polarization (e.g. right or left circular polarization). At 906, the second lens filters out light of the second polarization (e.g. right or left circular polarization) and passes at least light of the first polarization (e.g. left or right circular polarization).

At 908, the first lens redirects at least a portion of the incoming light passed by the first lens in at least a particular direction. Similarly, at 910, the second lens redirects at least a portion of the incoming light passed by the second lens in at least the particular direction.

As mentioned previously, the first and second lenses may be configured to redirect the light in a direction perpendicular to the stripes of the striped wave plate (e.g. the striped wave plate of the display 108). The displaced images may fill the dark lines with light from the neighboring illuminated lines and improve the viewing experience.

The systems and devices described above and illustrated in FIGS. 1-9 are merely examples and as such implementations are not limited these examples. Other features, variations and/or components would be apparent to one of ordinary skill in the art in view of this disclosure.

Figure 10:
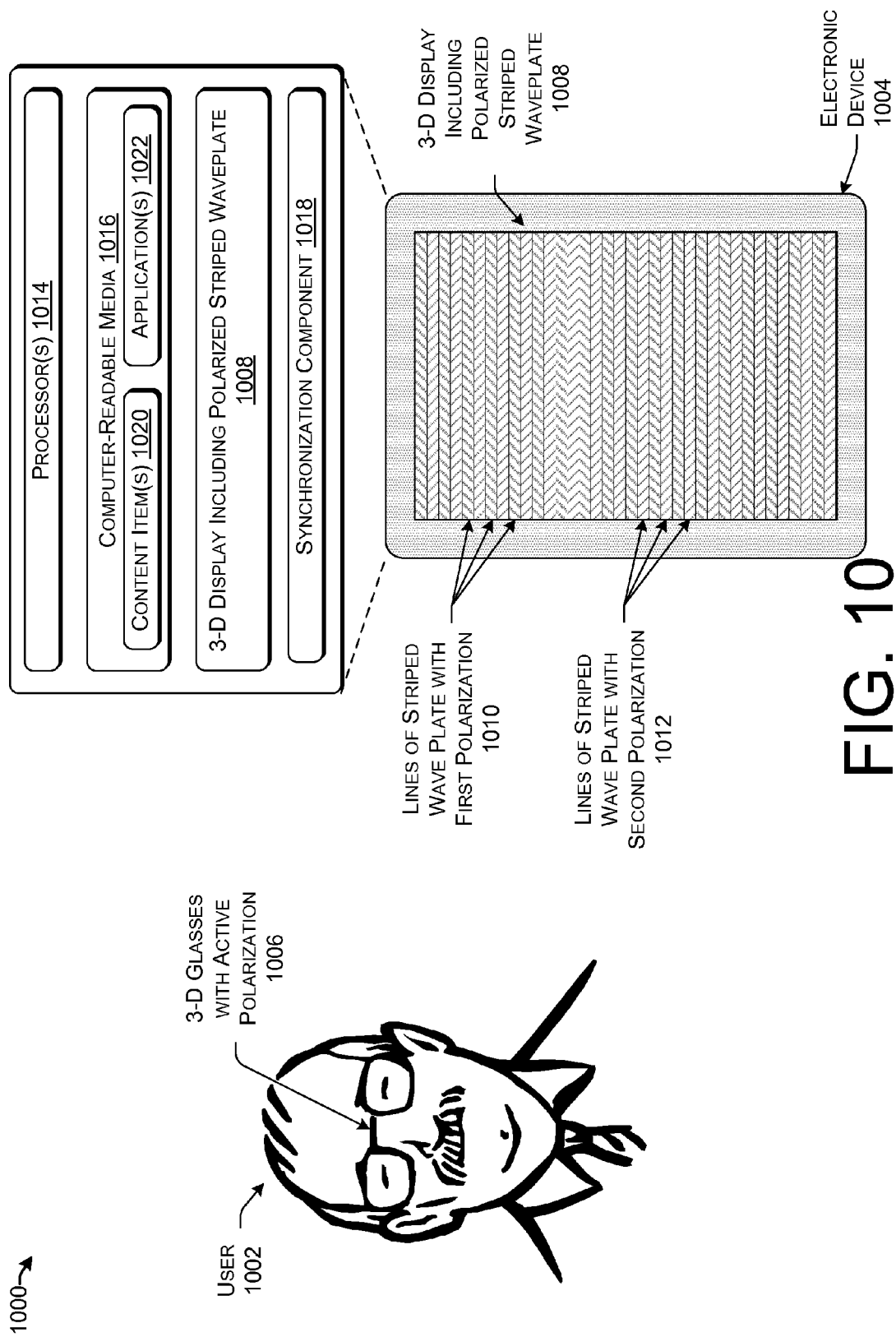
FIG. 10 illustrates an example 3D display system that includes active dark line compensation according to an embodiment of the present invention.

FIG. 10 illustrates an example system 1000 that includes active dark line compensation. As illustrated, a user 1002 is using an electronic device 1004. In particular, the user 1002 is utilizing 3D glasses 1006 with active polarization lenses to view the 3D display 1008 including a polarized striped wave plate of the electronic device 1004. The electronic device 1004 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). The 3D display 1008 of the electronic device 1004 includes a polarized striped wave plate that divides the display area of the 3D display 1008 into a plurality of horizontal lines of alternating polarization. In particular, the striped wave plate includes lines with a first polarization 1010 and lines with a second polarization 1012 (illustrated with different cross-hatching for ease of understanding).

The 3D glasses 1006 provide compensation for the dark line artifacts that result from the polarization of the alternating lines 1010 and 1012. In summary, the 3D glasses 1006 alternate from one state of polarization (e.g., left circular on left eye and right circular the other eye) to another (e.g., right circular on the left eye and left circular on the right eye) for each frame displayed by the display 1008. Synchronized with this, the pixels of the display corresponding to each striped wave plate line are alternated between pixel content of the left eye image and right eye image as the polarization of the lenses switches.

In particular, FIG. 10 further illustrates that the electronic device 1004 includes one or more processors 1014, computer-readable media 1016 and a synchronization component 1018. The synchronization component 1018 may include any form of interface including both wired and wireless connections to allow for communication with the active glasses 1006, such as cellular, radio, Wi-Fi, short range wireless interfaces (e.g., Bluetooth), IR, and so forth.

Depending on the configuration of the electronic device 1004, the computer-readable media 1016 (and other computer-readable media described throughout) is an example of computer storage media and may include volatile and nonvolatile memory. Thus, the computer-readable media 1016 may include, but is not limited to, RAM, ROM, EEPROM, flash memory, or other memory technology, or any other medium which can be used to store media items or applications and data which can be accessed by the electronic device 100.

The computer-readable media 1016 may be used to store any number of functional components that are executable on the processors 1014, as well content items 1020 and applications 1022. Thus, the computer-readable media 1016 may include an operating system and a storage database to store one or more content items, such as eBooks, audio books, songs, videos, still images, and the like. The computer-readable media 1016 of the electronic device 1006 may also store one or more content presentation applications to render content items on the 3D display 1008. These content presentation applications may be implemented as various applications depending upon the content items. For instance, the application may be an electronic book reader application for rending textual electronic books, an audio player for playing audio books or songs, a video player for playing video, and so forth.

In addition, the applications 1022 may include an application to control the display of content on the display and to synchronize the presentation with the alternating of the polarization of the lenses of the 3D glasses 1006. For example, an application 1022 may cause the processor 1014 to display the content on the display 1008 such that the pixels corresponding to each striped wave plate line are alternated between pixel content of the left and right images as the polarization switches. At the same time, the application 1022 may cause the processor 1014 to control the synchronization component 1018 to output a signal (e.g., IR, Bluetooth, etc.) to the 3D glasses to cause or allow the 3D glasses to synchronize the polarization of the lenses with the alternating of the pixel content between the left image and the right image. For example, in some implementations, the 3D glasses may comprise a processor, memory and an interface component corresponding to the synchronization component. The interface component may receive the signal output by the synchronization component 1018 and the processor of the 3D glasses may operate to control the lenses' polarization based on the received signal.

Figure 11A:
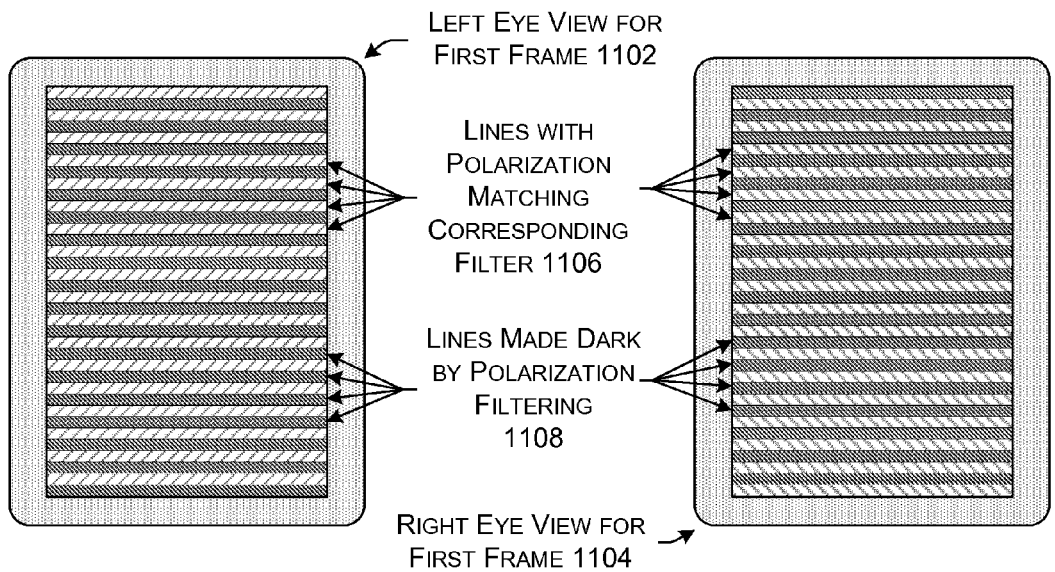
FIG. 11A illustrates an example diagram of the left and right views of a display for a first frame through active 3D glasses with dark line compensation according to an embodiment of the present invention.

FIG. 11A illustrates an example diagram 1100 of the left and right views of a display for a first frame through active 3D glasses with dark line compensation. In particular, FIG. 11A includes a left eye view 1102 for a first frame and a right eye view 1104 for the first frame. As can be seen, each of the views 1102 and 1104 include both lines 1106 that match the current polarization filter state of the left and right lenses of the glasses and lines 1108 that are made dark by the current polarization filtering of the lenses. As illustrated, the lines 1106 and 1108 of the left eye are inverted from the lines 1106 and 1108 of the right eye.

Figure 11B:
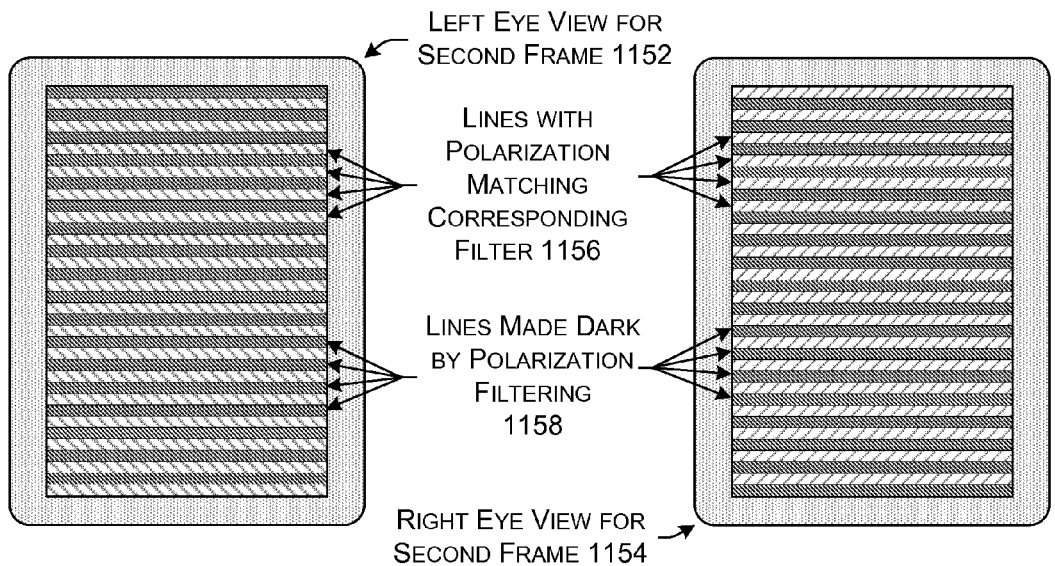
FIG. 11B illustrates an example diagram of the left and right views of the display for a second frame through active 3D glasses with dark line compensation according to an embodiment of the present invention.

FIG. 11B illustrates an example diagram 1150 of the left and right views of the display for a second frame through active 3D glasses with dark line compensation. In particular, FIG. 11B includes a left eye view 1102 for a second frame and a right eye view 1104 for the second frame. As can be seen, each of the views 1102 and 1104 continue to include both lines 1156 that match the current polarization filter of the left or right lenses of the glasses and lines 1158 that are darkened by the polarization filtering. However, the lines 1156 and 1158 are inverted from the lines 1106 and 1108 as the polarization change in the lenses has caused different lines to become bright for each eye.

As a result, a viewer may see the dark lines in the first frame as replaced with image data in the second frame. With sufficiently high cycling frequency (e.g. 60 hz), the eyes will average the intensity of the dark line and the image data and will not see a flicker. This is illustrated in FIG. 12.

Figure 12:
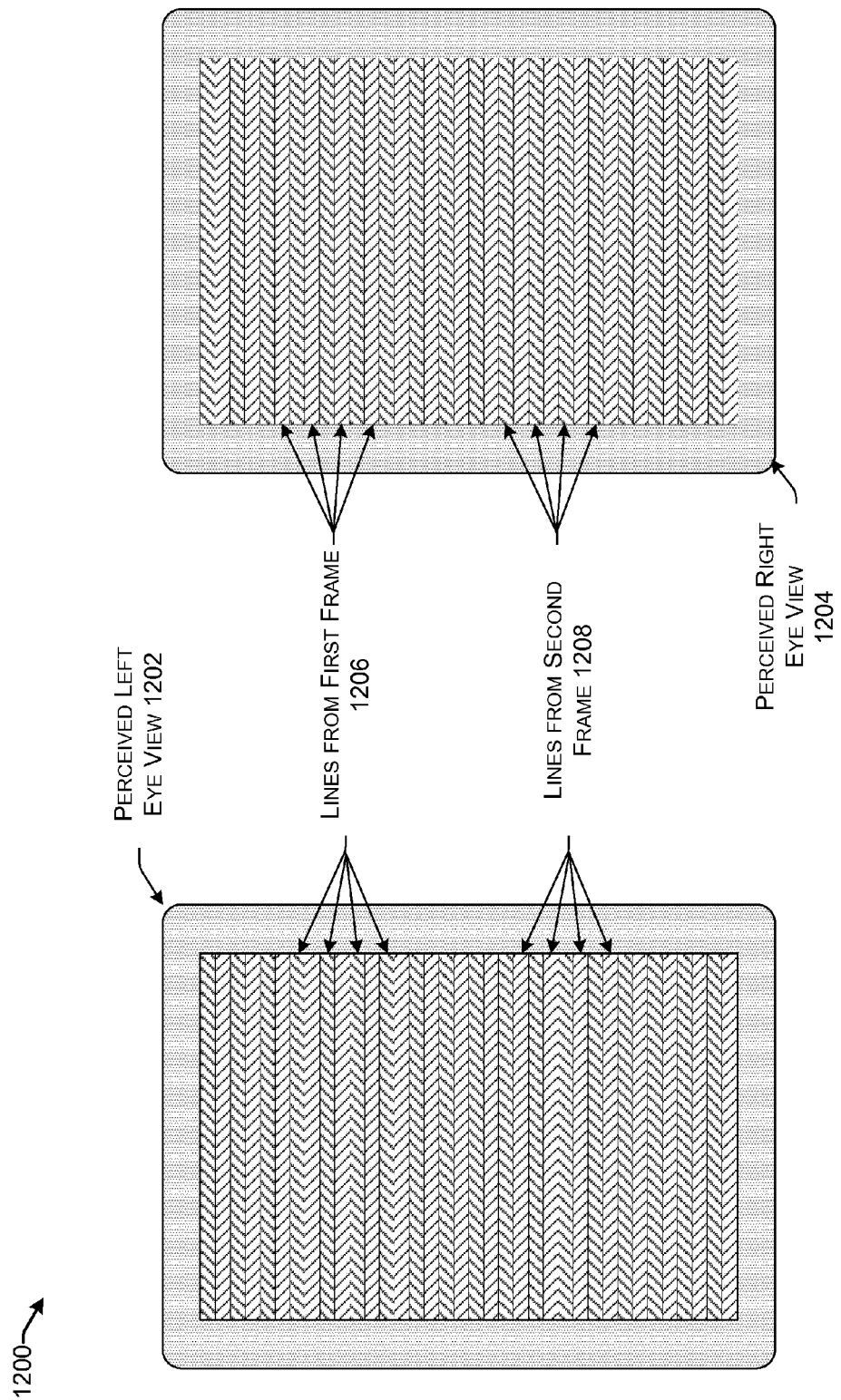
FIG. 12 illustrates a diagram of an example view perceived by a viewer viewing the views of FIGS. 11A and 11B according to an embodiment of the present invention.

FIG. 12 illustrates a diagram 1200 of an example perceived view resulting from the views of FIGS. 11A and 11B being viewed by a viewer. In particular, FIG. 12 includes a perceived left eye view 1202 and a perceived right eye view 1204. As a result of high cycling frequency, the viewer perceives the lines from the first frame 1206 and the second frame 1208 fused together to form a view without dark line artifacts.

In some implementations, the content of the left or right image rows may be the same regardless of which polarization is showing the content. Considering a still image being displayed, the displaying of content using the pair of the first and second stripe lines would operate as follows. In a first frame, a first particular image content of the left image would be displayed in the first stripe line while a second particular image content of the right image would be displayed in the second stripe line. In a second frame, the second particular image content of the right image would be displayed in the first stripe line while the first particular image content of the left image would be displayed in the second stripe line. As a result, the dark line is compensated for but the overall resolution is reduced for the images perceived. For example, for horizontal stripe lines over a 1080 resolution display, the resolution is reduced to 540 for each eye. Of course, in such implementations, the content itself may change between frames (e.g. in motion pictures) but the position shift between the stripes may not be reflected in the changed content.

In other implementations, the content of the left or right image rows may be specific to which polarization is showing the content. Again considering a still image being displayed, the displaying of content using the pair of the first and second stripe lines would operate as follows. In a first frame, a first particular image content of the left image would be displayed in the first stripe line while a second particular image content of the right image would be displayed in the second stripe line. In a second frame, the first and second particular image content would not be displayed. Instead, a third particular image content of the right image would be displayed in the first stripe line while a fourth particular image content of the left image would be displayed in the second stripe line. In other words, image content belonging to the specific region of the particular stripe line is what is displayed in the stripe line, even as it alternates between left and right images. As a result, the dark line is compensated for and the overall resolution is maintained for the perceived images. For motion pictures, depending on the particular implementation and the source content being displayed, the content of each frame may be a time specific frame (e.g. the position shift and a time slice is reflected for each displayed frame) or pairs of displayed frames may be specific to a particular time (e.g. the position shift is reflected but a single time specific frame is divided into two displayed frames).

Figure 13:
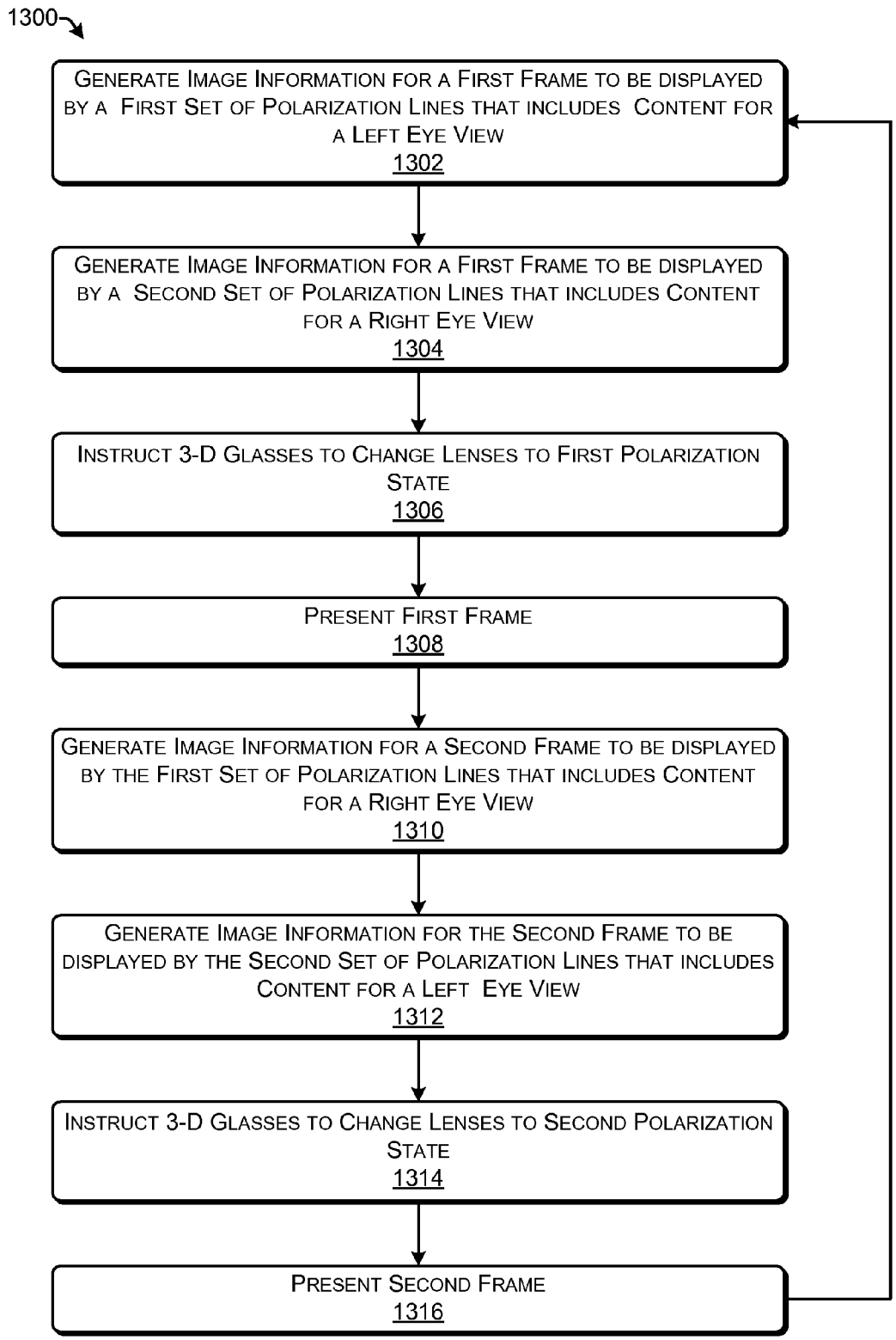
FIG. 13 illustrates an example flow diagram for the operations of the electronic device to provide 3D images in an active polarized 3D system according to an embodiment of the present invention.

FIG. 13 illustrates an example flow diagram 1300 for the operations of the electronic device 1004 to provide 3D images in a polarized 3D system using the techniques described herein. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 1302, the electronic device 1004 may generate image information for a first frame to be displayed by a first set of polarization lines that includes content for a left eye view. At 1304, the electronic device 1004 may generate image information for a first frame to be displayed by a second set of polarization lines that includes content for a right eye view.

At 1306, the electronic device 1004 may instruct the 3D glasses to change the lenses to a first polarization state. For example, first polarization state may be a state in which the left lens is left circular polarized and the right lens is right circular polarized. At 1308, in synchronization with the change of the polarization state of the lenses, the electronic device 1004 may present the first frame based on the image information determined at 1302 and 1304. The displaying of the first frame based on the image information determined at 1302 and 1304 may also be referred to as entering a first display state of some implementations.

At 1310, the electronic device 1004 may generate image information for a first frame to be displayed by a first set of polarization lines that includes content for a right eye view. At 1312, the electronic device 1004 may generate image information for a first frame to be displayed by a second set of polarization lines that includes content for a left eye view.

At 1314, the electronic device 1004 may instruct the 3D glasses to change the lenses to a second polarization state. For example, the second polarization state may be a state in which the left lens is right circular polarized and the right lens is left circular polarized. At 1316, in synchronization with the change of the polarization state of the lenses, the electronic device 1004 may present the second frame based on the image information determined at 1310 and 1312. The displaying of the second frame based on the image information determined at 1310 and 1312 may also be referred to as entering a second display state of some implementations. The process may then repeat.

In some implementations, the active polarization changing of the lenses may be designed to switch from right circular polarization to left circular polarization at a rate of 60 Hz. The lenses may be made with the combination of a uniform plate liquid crystal layer and a linear polarizer. The liquid crystal layer may switch from providing a quarter wave phase advance to one axis of light polarization compared to its orthogonal component, to providing a quarter wave phrase retardation. By placing this on the front of the eyeglass lens, the light coming from the striped wave plate of the display, which is either right or left circularly polarized, may be converted respectively to linear polarized light in the orientation of the wave plate axis, or into linear light at the orthogonal axis. By switching the liquid crystal state, these axes will be exchanged. By placing a linear polarizer after the liquid crystal modulator which is aligned with one of its axes, the right lens may first pass light from one set of lines in the striped wave plate in the first state and then may pass light from the other set of lines when the liquid crystal is switched to the second state.

Implementations are not limited to those specifically described herein and numerous other variations would be apparent in view of this disclosure. For example, in some implementations similar to the active 3D system illustrated and described with regard to FIGS. 10-13 may also include the dark line compensation described with regard to FIGS. 1-9. Further, the display state of the display is not limited to frame wise changes nor is the polarization state of the glasses limited to changing on a per displayed frame basis. For example, the display state and the polarization states may change every other frame of information or for some multiple of frames in some implementations. This and other variations would be apparent to the skilled artisan in view of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   an electronic device comprising:
      a three-dimensional (3D) display comprising a striped wave plate that (i) polarizes light emitted from a first set of stripes of the display with a first polarization and (ii) polarizes light emitted from a second set of stripes of the display with a second polarization, which is different from the first polarization, the striped wave plate configured such that stripes of the striped wave plate alternate between stripes of the first set of stripes and stripes of the second set of stripes; and
   passive 3D glasses comprising:
      a first polarized lens that filters out light of the second polarization and includes a first diffraction element that redirects at least a first portion of the light emitted from the display into one or more first diffraction orders, wherein the one or more first diffraction orders are configured such that the first portion of the light appears in an area of at least one stripe of the second set of stripes when viewed through the first polarized lens of the glasses; and
      a second polarized lens that filters out light of the first polarization and includes a second diffraction element that redirects at least a second portion of the light emitted from the display into one or more second diffraction orders, wherein the one or more second diffraction orders are configured such that the second portion of the light appears in an area of at least one stripe of the first set of stripes when viewed through the second polarized lens of the glasses.

2. A system as recited in claim 1, wherein the first diffraction element and second diffraction element comprise a phase grating that redirects the first portion of the light by diffracting the first portion into the one or more first diffraction orders and the second portion of the light by diffracting the second portion of light into the one or more second diffraction orders.

3. A system as recited in claim 1, wherein the stripes of the striped wave plate have a longest dimension in a first direction that is substantially horizontal; and
   wherein the first polarized lens and the second polarized lens, when positioned in a viewing orientation that is substantially horizontal, redirect the first portion of light and the second portion of light in a second direction that is substantially perpendicular to the first direction.

4. A system as recited in claim 1, wherein a diffraction order of the one or more first diffraction orders redirects a part of the first portion of the light, the part of the first portion of light emitted from at least one particular stripe of the first set of stripes of the display, the part redirected by the diffraction order such that the part appears in areas of at least two stripes of the second set of stripes, the at least two stripes being adjacent to the first particular stripe when viewed through the first polarized lens of the glasses.

5. A system as recited in claim 1, wherein:
the first diffraction element comprises a phase grating that separates the first portion of light by diffracting the first portion of light into the one or more first diffraction orders, such that
light perceived as being in an area of at least one first particular stripe of the first set of stripes in a view through the first polarized lens comprises a weighted sum of (a) light emitted from the first particular stripe that is not redirected by the phase grating and (b) light emitted by a second particular stripe of the first set of stripes that is redirected by the phase grating.

6. A system comprising:
glasses comprising:
a first polarized lens including a first phase grating that (i) filters out light of a first polarization received from a first set of areas of a display and intersecting the first polarized lens and (ii) redirects at least a first portion of light intersecting the first polarized lens in a first axis into one or more first diffraction orders such that the first portion of the light intersecting the first polarized lens fills in perceived dark areas caused by filtering out of light of the first polarization by the first polarized lens; and
a second polarized lens including a second phase grating that (iii) filters out light of a second polarization, which is different from the first polarization, received from a second set of areas of the display and intersecting the second polarized lens and (iv) redirects at least a second portion of light intersecting the second polarized lens in the first axis into the one or more second diffraction orders such that the second portion of the light intersecting the second polarized lens fills in perceived dark areas caused by filtering out of light of the second polarization by the second polarized lens.

7. A system as recited in claim 6, wherein the one or more first diffraction orders include a plurality of diffraction orders that are not symmetric.

8. A system as recited in claim 7, wherein the first polarized lens redirects the portion of light intersecting the first polarized lens in the first axis such that a portion of the light emitted by one or more areas of the second set of areas appears in one or more areas of the first set of areas when viewed through the first polarized lens.

9. A system as recited in claim 6, wherein the first polarized lens redirects a part of the portion of light intersecting the first polarized lens emitted from at least one particular area of the second set of areas of the display such that the part of the portion of the light appears in at least two areas of the first set of areas that are adjacent to the at least one particular area when viewed through the first polarized lens.

10. A system as recited in claim 6, wherein the first phase grating comprises a repetitive linear phase structure.

11. A system as recited in claim 10, wherein a plurality of diffraction orders includes the one or more first diffraction orders and one or more second diffraction orders, and the first phase grating structure is configured such that an intensity of light of an individual diffraction order other than a zeroth order of the plurality of diffraction orders is less than intensities of orders lower than the individual diffraction order.

12. A system as recited in claim 7, wherein:
light perceived as being within a first particular area when viewed using the first polarized lens comprises a weighted sum of a portion of light that is not diffracted by the first phase grating and a portion of light that is diffracted by the first phase grating.

13. A system as recited in claim 6, wherein:
the one or more first diffraction orders are based on a diffraction distance substantially equal to a multiple of a pixel height of the display.

14. A system as recited in claim 6, wherein the first phase grating is etched on the first polarized lens.

15. A system as recited in claim 6, wherein the first phase grating is configured such that the first portion of light intersecting the first polarized lens comprises a weighted sum of a third portion of light that is not redirected by the first phase grating and a fourth portion of light that is redirected by the first phase grating.

16. A method comprising:
filtering out, by a first polarized lens of glasses, light of a first polarization received from a first area on a display;
filtering out, by a second polarized lens of glasses, light of a second polarization, which is different from the first polarization, received from a second area on the display;
redirecting, by a diffraction element of the first polarized lens, at least a portion of light intersecting the first polarized lens into one or more first diffraction orders, wherein the first polarized lens is configured to redirect the light of the first polarization in a direction perpendicular to a long side of the first area of the display when the glasses are positioned in a viewing orientation with respect to the display; and
redirecting, by a diffraction element of the second polarized lens, at least a portion of light intersecting the second polarized lens into one or more second diffraction orders, wherein the first polarized lens is configured to redirect the light of the second polarization in a direction perpendicular to a long side of the first area of the display when the glasses are positioned in a viewing orientation with respect to the display.

17. A method as recited in claim 16, wherein the diffraction element includes one or more of:
a phase grating structure formed on the first polarized lens;
a uniaxial directional scatter plate structure formed on the first polarized lens;
a low power cylindrical lens structure formed on the first polarized lens;
a microstructure of tiled prisms or slabs formed on the first polarized lens; or
a vibration mechanism that vibrates the first polarized lens along the particular direction.

18. A method as recited in claim 16, wherein the diffraction element of the second polarized lens is configured to redirect the light of the second polarization in a direction perpendicular to a long side of the second area of the display when the glasses are positioned in a viewing orientation with respect to the display.

19. A method as recited in claim 16, wherein the diffraction element comprises a phase grating structure formed on the first polarized lens into the one or more first diffraction orders with a diffraction distance substantially equal to a multiple of a pixel height of a display, and the phase grating structure separates the portion of incoming light.

20. A method as recited in claim 16, wherein the phase grating structure is configured such that light perceived as being in a first particular area when viewed using the first polarized lens comprises a weighted sum of a first portion of light that is not redirected by the phase grating structure and a second portion of light is redirected by the phase grating structure.

* * * * *